(12) United States Patent
Dutta et al.

(10) Patent No.: US 9,961,012 B2
(45) Date of Patent: May 1, 2018

(54) PER-STAGE ASSIGNMENT OF PIPELINES AGENTS

(71) Applicant: Microsoft Technology Licensing, LLC, Redmond, WA (US)

(72) Inventors: Amit Kumar Dutta, Sammamish, WA (US); Krishnan Ananthanarayanan, Redmond, WA (US); Vishak Gopal, Redmond, WA (US); Mieszko Matkowski, Woodinville, WA (US); Mahendra Sekaran, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 136 days.

(21) Appl. No.: 14/977,082

(22) Filed: Dec. 21, 2015

(65) Prior Publication Data

US 2017/0180268 A1      Jun. 22, 2017

(51) Int. Cl.
*G06F 15/16*      (2006.01)
*H04L 12/911*      (2013.01)

(52) U.S. Cl.
CPC .................. *H04L 47/783* (2013.01)

(58) Field of Classification Search
USPC ................................................ 709/226–228
See application file for complete search history.

(56) References Cited

U.S. PATENT DOCUMENTS

| | | |
|---|---|---|
| 5,036,535 A | 7/1991 | Gechter et al. |
| 5,828,747 A | 10/1998 | Fisher et al. |
| 5,903,641 A | 5/1999 | Tonisson |
| 6,192,122 B1 | 2/2001 | Flockhart et al. |
| 6,449,356 B1 * | 9/2002 | Dezonno .................. H04M 3/51 379/265.01 |
| 6,535,600 B1 | 3/2003 | Fisher et al. |
| 6,804,346 B1 | 10/2004 | Mewhinney |
| 6,886,038 B1 * | 4/2005 | Tabbara .................. H04L 67/34 709/223 |

(Continued)

FOREIGN PATENT DOCUMENTS

GB      2425913      11/2006

OTHER PUBLICATIONS

International Search Report and the Written Opinion issued in PCT Application No. PCT/US2016/066427 dated Mar. 8, 2017.

(Continued)

*Primary Examiner* — Jude Jean Gilles
(74) *Attorney, Agent, or Firm* — Workman Nydegger

(57) ABSTRACT

The customization of a communication pipelines having multiple stages. For each stage, a set of agent(s) is/are identified as available for adding to that stage. Furthermore, any stages that already have an agent assigned are identified. In response to receiving a user selection of an agent to be assigned to a particular stage, that does not already have an agent assigned, the selected agent is assigned to the stage. An enforcement agent enforces that there be only one agent assigned at most to each stage. Assignments of agents are made per stage. This allows the functionality of the agent to be simplified more towards augmenting the functionality of the stage. Accordingly, the logic of the agent is simplified, thereby making it more likely that there will be a healthy quality of agents available to select from for each stage.

21 Claims, 4 Drawing Sheets

(56) References Cited

U.S. PATENT DOCUMENTS

| | | | |
|---|---|---|---|
| 7,023,979 B1 | 4/2006 | Wu et al. | |
| 7,088,809 B1 | 8/2006 | Gits et al. | |
| 7,110,523 B2 | 9/2006 | Gagle et al. | |
| 8,565,412 B2 | 10/2013 | Foster et al. | |
| 8,675,839 B1* | 3/2014 | Noble, Jr. | H04M 3/5175 379/112.08 |
| 9,430,294 B2* | 8/2016 | Hays | G06F 9/5061 |
| 9,712,608 B2* | 7/2017 | Shukla | H04L 67/1006 |
| 9,781,205 B2* | 10/2017 | Batrouni | H04L 67/1097 |
| 2004/0081309 A1* | 4/2004 | Bickford | H04M 3/51 379/265.02 |
| 2004/0243824 A1* | 12/2004 | Jones | G06F 21/10 713/166 |
| 2005/0114854 A1* | 5/2005 | Padisetty | G06F 9/5038 718/1 |
| 2006/0069713 A1* | 3/2006 | Wei | G06F 9/4862 709/202 |
| 2007/0083725 A1* | 4/2007 | Kasiolas | G06F 3/0605 711/165 |
| 2009/0183317 A1* | 7/2009 | Meier | C11D 3/18 8/137 |
| 2009/0232295 A1* | 9/2009 | Ryskamp | H04M 3/2281 379/265.11 |
| 2010/0114644 A1 | 5/2010 | Fama et al. | |
| 2010/0313016 A1* | 12/2010 | Zhang | G06F 21/56 713/168 |
| 2012/0110106 A1* | 5/2012 | De Lescure | G06F 15/16 709/211 |
| 2014/0079207 A1 | 3/2014 | Zhakov et al. | |
| 2014/0164705 A1* | 6/2014 | Corbal | G06F 9/30047 711/122 |
| 2014/0270135 A1 | 9/2014 | Odinak et al. | |

OTHER PUBLICATIONS

Chan, et al., "Dynamic Call Center Routing Policies Using Call Waiting and Agent Idle Times", In Journal of Manufacturing & Service Operations Management, vol. 16, Issue 4, Oct. 2014, pp. 1-23.

"Call Center Technology", Published on: Jan. 17, 2012 Available at: http://www.zeacom.com/call-center-technology.

Dietz, Dennis C., "Practical scheduling for call center operations", Published on: Oct. 2011 Available at: http://www.sciencedirect.com/science/article/pii/S0305048310001556.

Akhtar, et al., "Exploiting Simulation for Call Centre Optimization", In Proceedings of the World Congress on Engineering, vol. 3, Jun. 30, 2010, 6 pages.

"Oracle??Interaction Center Intelligence", Published on: Oct. 2001 Available at: https://docs.oracle.com/cd/A91568_01/acrobat/bix115ug.pdf.

"International Preliminary Report on Patentability Issued in PCT Application No. PCT/US2016/066427", dated Nov. 10, 2017, 5 Pages.

* cited by examiner

400

500

PER-STAGE ASSIGNMENT OF PIPELINES AGENTS

BACKGROUND

Computing systems and associated networks have revolutionized the way human beings work, play, and communicate. Nearly every aspect of our lives is affected in some way by computing systems. Entire new forms of communication are enabled via the use of networks of computing systems. Examples of such new forms of communication include text messaging, instant message, video conferencing, electronic whiteboarding, collaborative applications, voice over Internet Protocol, and so forth.

Each of these forms of communication involve stages of operation. For instance, when receiving a call, there may be call screening stage, and then a pre-routing stage. A call setup failed stage is encountered if the recipient cannot be reached. A rejected stage is encountered if the caller is reached, but the recipient chooses to reject the call. A connected stage is encountered if the call is connected with the recipient. A call ended stage is encountered when the call connection ends.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the customization of a communication pipelines having multiple stages. For each of at least some of the stages, a set of one or more agents are identified as available for adding to that stage. Furthermore, any stages that already have an agent assigned are identified. In response to receiving a user selection of an agent to be assigned to a particular stage, that does not already have an agent assigned, the selected agent is assigned to the stage. An enforcement agent enforces that there be only one agent assigned at most to each stage.

Assignments of agents are made per stage. This allows the functionality of the agent to be simplified more towards augmenting the functionality of the stage. Accordingly, the logic of the agent is simplified, thereby making it more likely that there will be a healthy quality of agents available to select from for each stage. From the pipeline users' perspective, this allows a greater degree of customization of the communication enabled by the pipeline. In some embodiments, a single agent may be assigned as the agent to multiple stages.

Accordingly, the principles described herein allow for a more robust mechanism to provide options for customizing any kind of communication that involves multiple stages in a pipeline. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

At least some embodiments described herein relate to the customization of a communication pipelines having multiple stages. For each of at least some of the stages, a set of one or more agents are identified as available for adding to that stage. Furthermore, any stages that already have an agent assigned are identified. In response to receiving a user selection of an agent to be assigned to a particular stage, that does not already have an agent assigned, the selected agent is assigned to the stage. An enforcement agent enforces that there be only one agent assigned at most to each stage.

Assignments of agents are made per stage. This allows the functionality of the agent to be simplified more towards augmenting the functionality of the stage. Accordingly, the logic of the agent is simplified, thereby making it more likely that there will be a healthy quality of agents available to select from for each stage. From the pipeline users' perspective, this allows a greater degree of customization of the communication enabled by the pipeline. In some embodiments, a single agent may be assigned as the agent to multiple stages.

Accordingly, the principles described herein allow for a more robust mechanism to provide options for customizing any kind of communication that involves multiple stages in a pipeline. Some introductory discussion of a computing system will be described with respect to FIG. 1. Then, the structure and operation of agent assignment to multi-stage communication pipelines will be described with respect to subsequent figures.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
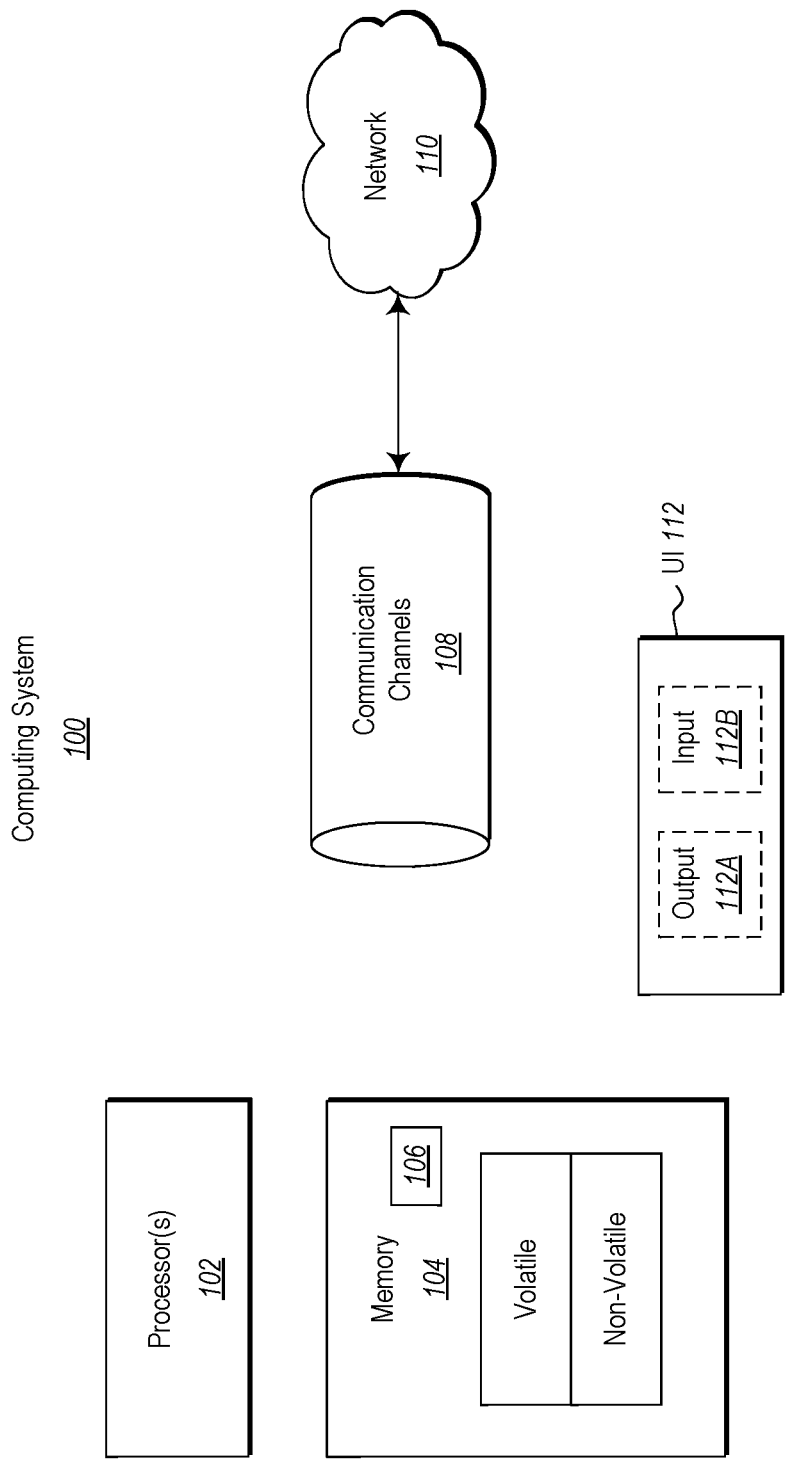
FIG. 1 abstractly illustrates a computing system in which some embodiments described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "controller", "agent", "stage" or the like may also be used. As used in this description and in the case, these terms are also intended to be synonymous with the term "executable component" or be specific types of such an "executable component", and thus also have a structure that is well understood by those of ordinary skill in the art of computing. In some embodiments, an "agent" may be an executable component that is automated and/or performed remotely, such as on a service and/or in a cloud computing environment.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Figure 2A:
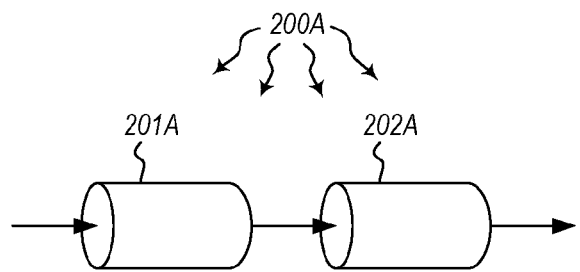
FIG. 2A illustrates a simply example communication pipeline having two stages in series.

In accordance with the principles described herein, agents are added to in a controlled fashion to various stages on a communication pipeline such that there is enforced to be only one agent per stage of the communication pipeline for at least some (and preferably all) of the stages of the communication pipeline. The exact number, identity, and configuration of the stages of the pipeline will vary according to the type of communication and the design of the pipeline. The principles described herein are not limited to that assignment to agents to stages of any particular pipeline. Nevertheless, for purposes of example only, FIG. 2A illustrates a simple pipeline 200A having two stages 201A and 202A in series. For 2B illustrates a more complex pipeline have six stages 201B through 206B and pipeline branching.

As an example, the communication pipeline may be a text-based communication pipeline, such as a pipeline for sending and/or receiving text messages, or such as an instant messaging pipeline for sending and/or receiving instance messages. FIG. 2A represents an example of a possible instant messaging pipeline, in which case stage 201A might represent a pre-delivery stage, and stage 202A might represent a post-delivery stage.

Figure 2B:
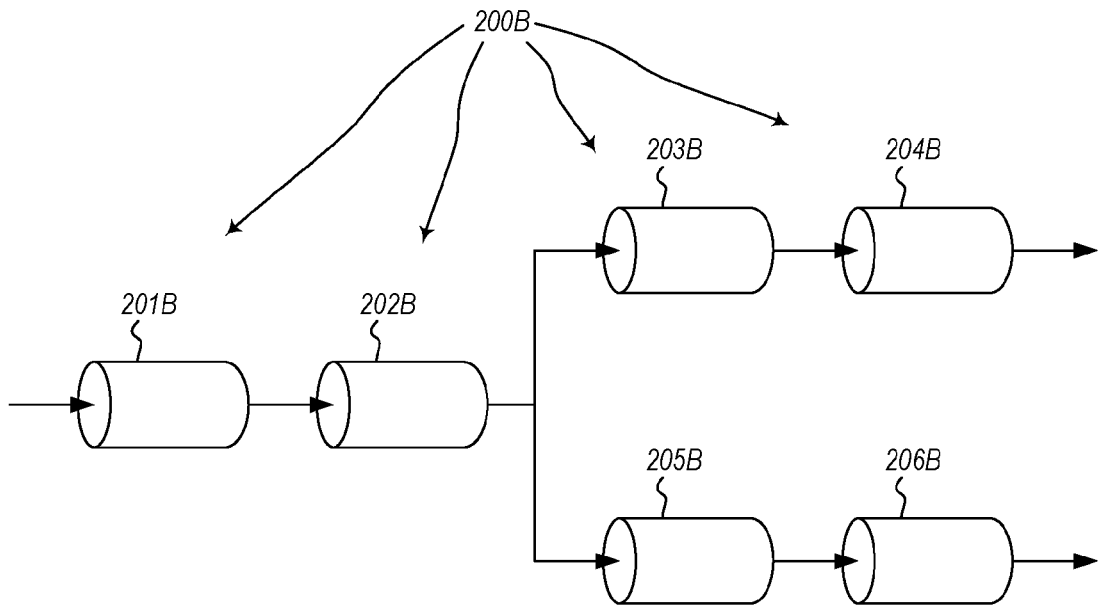
FIG. 2B illustrates a more complex communication pipeline have six stages and the pipeline branching.

As another example, the communication pipeline may be an audio and/or video communication pipeline, such as for voice or video-conference call initiation or reception. FIG. 2B illustrates an example call reception pipeline 200B having stages 201B through 206B. In the case of call reception, in one design of the same, the stage 201B may be a call screening stage, the stage 202B may be a pre-routing state, the stage 203B may be a call setup failed stage, the stage 204B may be a rejected stage, the stage 205B may be a connected stage, and the stage 206B may be a call ended stage.

In accordance with the principles described herein, at least some (and preferably all) of the stages only have a maximum of one agent assigned them. Furthermore, agents are assigned to pipelines on a per stage basis. This means that the task involved with drafting agents may be narrowly tailored to provide value add to a particular stage, without having to worry about providing value-add for other stages of the pipeline. This significantly simplifies the process of generating new stage-based agents, and thereby makes it more likely that users of pipelines will have more agents available to them for each stage. This higher level of agent availability also means that the user will have higher levels of customization of the pipeline to suit the needs of the user.

Furthermore, the user may make assignments of agents to stages without even having a knowledge of the structure of the pipeline. The agent is simply registered as corresponding to a particular stage, and an enforcement mechanism prevents more than one agent being assigned to a stage. For those stages in which there is enforced a maximum of one agent per stage, the need to perform conflict resolution (such as which agent to utilize first) is avoided, thereby technically simplifying the process of administering the pipeline, and also ensuring more predictability in the operation of the pipeline.

Figure 3:
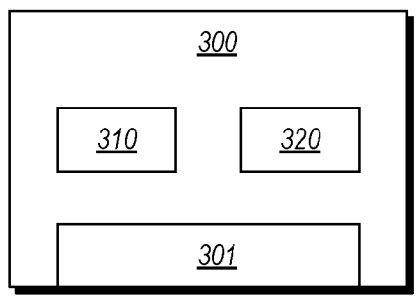
FIG. 3 illustrates a multi-stage agent having logic applicable to one stage of the pipeline, and logic applicable to another stage of the pipeline.

In some embodiments, an agent may register as applicable to multiple stages. For instance, FIG. 3 illustrates a multi-stage agent 300 having logic 310 applicable to one stage of the pipeline, and logic 320 applicable to another stage of the pipeline. Such multi-stage agents may also have a stage identifying component 301 which identifies which stage the agent is being used for, and initiates the corresponding logic 310 or 320 appropriately. For instance, when calling the agent, the stage of the pipeline may inform the multi-stage agent 300 of which stage the communication is presently within.

Figure 4:
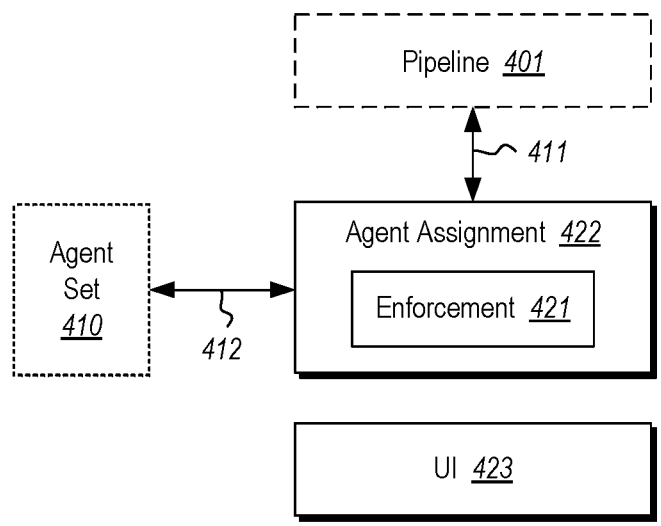
FIG. 4 illustrates an agent management computing system for assigning agents to a communication pipeline having multiple stages.

FIG. 4 illustrates an agent management computing system 400 for assigning agents 410 to a communication pipeline 401 having multiple stages. As an example, the agent management component system 400 may have the structure described above for the computing system 100 of FIG. 1. Furthermore, any of the components contained within the agent management computing system 400 may have the structure described above of the executable component 106 of FIG. 1. The communication pipeline 401 may be any communication pipeline as previously described, regardless of the nature of the communication, or the structure of the pipeline.

The agent management computing system 400 includes an enforcement component 421 that enforces that each of at least some (and preferably all) of the stages of the pipeline have only one agent assigned to the stage. The agent management computing system 400 also has an agent assignment component 422 that assigns agents to the stages of the pipeline 401. The operation of the agent assignment component 422 will be described further below with respect to FIGS. 5 and 6. The agent assignment component 422 may operate integrally with the enforcement component 421 as described with respect to the method 600 of FIG. 6. Accordingly, although the agent assignment component 422 does not need to include the enforcement component 421, the enforcement component 421 is illustrated as being included within the agent assignment component 422. Alternatively, the agent assignment component 422 could simply communicate with the enforcement component 421 so that a maximum of one agent as assigned to each stage covered by the enforcement component 422.

In some embodiments, the agent assignment is performed in response to user interaction. Accordingly, the agent management computing system 400 may also include a user interface component 423. As an example, if the agent management computing system 400 were the computing system 100 of FIG. 1, the user interface component 423 may be the user interface 112 of FIG. 1.

The agent management computing system 400 has access to the structure, at the stage level, of the pipeline 401 as represented by the arrow 411. The agent management computing system 400 also has access to the identity of the agents within the agent set 410 as well as which stages of the pipeline each agent is registered to be assignable to, as represented by arrow 412.

Figure 5:
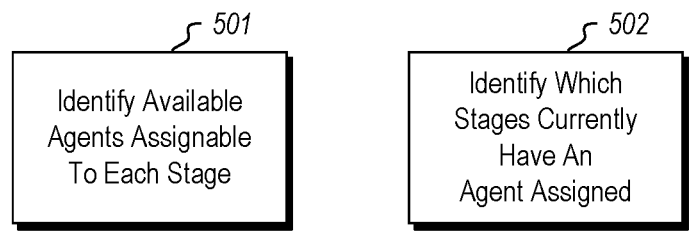
FIG. 5 illustrates a flowchart of a method for preparing for customizing a communication pipeline having a plurality of stages.

FIG. 5 illustrates a flowchart of a method 500 for preparing for customizing a communication pipeline having a plurality of stages. The method 500 may be performed by the agent management computing system 400 of FIG. 4. Accordingly, the method 500 will be described with references back to the agent management computing system 400 of FIG. 4. Furthermore, the description will be made with the pipeline 401 being the pipeline 200B of FIG. 2B, although it will be understood that this is simply an example.

The method 500 includes, for each stage, identifying a set of one or more agents that are available for adding to a stage (act 501). For instance, the agent assignment component 422 is aware of the stages of the pipeline 401 (i.e., the stages of the pipeline 200B in the example of FIG. 2B), and is also aware of which agents within the agent set 410 are eligible for being assigned to each stage. Eligibility may be based on which stage or stages an agent registered as being compatible with, and may also consider permissions of the user of the pipeline 401.

The agent assignment component 422 or the enforcement component 421 also identify which stages of the pipeline already have an agent assigned to that stage (act 502). Acts 501 and 502 may be seen as preparatory so that the agent assignment component 422 may readily make further assignments once the action to assign is triggered by an appropriate event (e.g., event 601 of FIG. 6). Such an event may include for instance, the selection of a user to add an agent to the pipeline.

Figure 6:
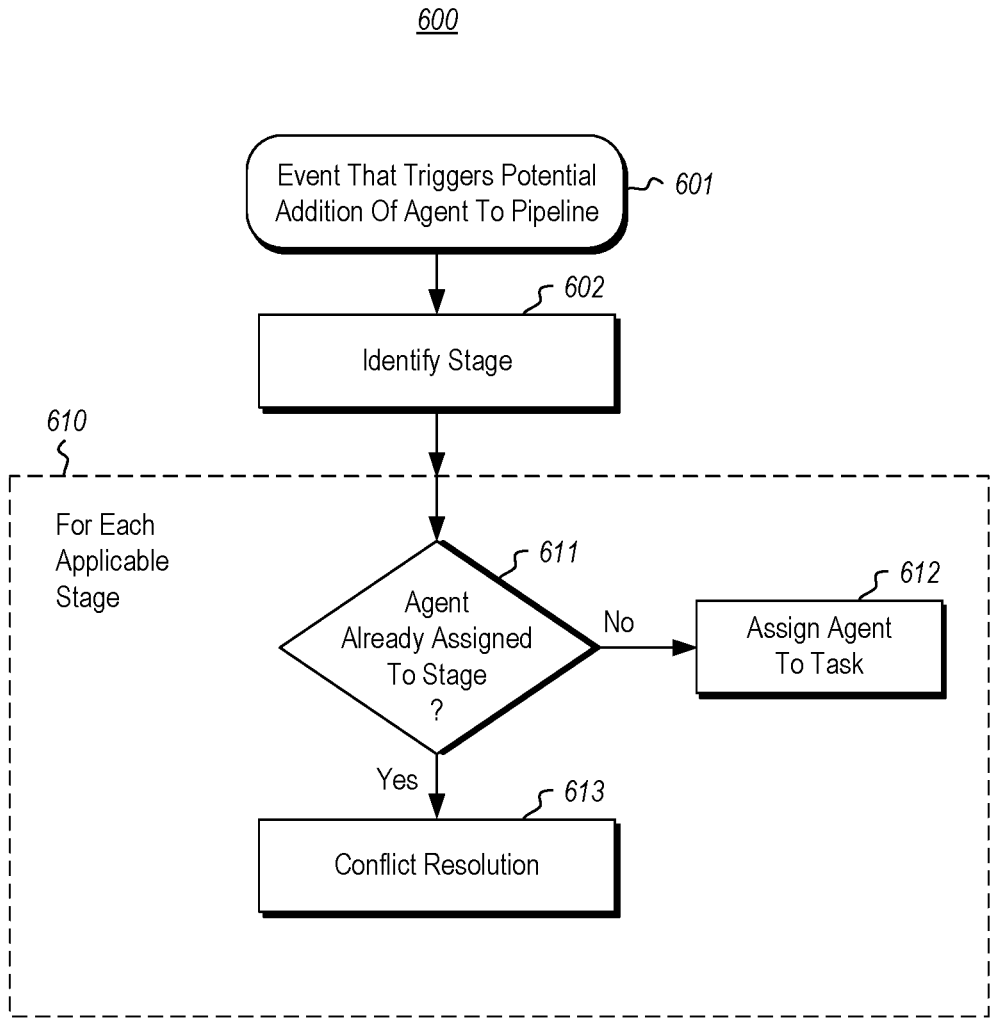
FIG. 6 is a flowchart of a method adding an agent to the pipeline, which method may be repeatedly performed for various stages of the communication pipeline to permit customization of a communication pipeline.

FIG. 6 is a flowchart of a method 600 for customizing a pipeline. The method 600 is performed each time an agent is added to the pipeline. The method 600 is triggered by the detection of a triggering event (act 601). The triggering event may be, for instance, that the user has selected an agent for addition to the pipeline. Note that the user need not identify the stage (and in fact there may be no mechanism for the user to identify the stage) that the agent is to be assigned to. The agent assignment component 422 simply has knowledge of which stage or stages the agent is appropriate for. In fact, the next act is to identify which stage or stages that the identified agent is appropriate for (act 602).

For each stage that the agent is assignable to, the remainder of the method 600 (within box 610) may be performed for each appropriate stage. For instance, suppose that the multi-stage agent 300 of FIG. 3 is selected for addition to the pipeline, and logic 310 is applicable to stage 201B and logic 320 is applicable to stage 202B, the contents of box 610 may then be performed for each of the stages 201B and 202B. However, in the case that an agent is to be added to the pipeline 401, and the agent is suitable for but a single stage, the contents of box 610 are only performed for a single time.

In particular, the agent assignment component determines whether an agent has already been assigned to the corresponding stage (decision block 611). This determination may be made via use of the enforcement component 621, or by otherwise checking to be sure there is no agent currently assigned to the corresponding stage. If there is not an agent currently assigned to the stage ("No" in decision block 611), then the agent may simply be assigned to the stage (act 612), and the method 600 completes with successful addition of an agent to the pipeline.

On the other hand, if there is an agent already currently assigned to the corresponding stage ("Yes" in decision block 611), then it is enforced that there only be one agent assigned to the stage (act 613). This enforcement may involve some conflict resolution mechanism that may be executed by the enforcement component 421. The conflict resolution may be quite simple, such as refusing to add the requested agent to the pipeline, or replacing the current agent of the pipeline with the newly selected agent of the pipeline. Alternatively, or in addition, the user might be notified to allow the user to determine which agent the user of the pipeline prefers. Perhaps differences in functionality may be highlighted if functionality is somehow registered with the agent assignment component 422 when the agent was added to the agent set 410. The principles described herein are not limited to how this conflict is resolved. However, the conflict is not resolved by allowing two agents to be assigned to the same stage. This again simplifies the process of administering the pipeline, since executing the stage does not involve having to apply intelligence (e.g., code complexity) to determine which agent should run first, when execution of an agent is to be paused so that the other agent can run, and so forth.

Several examples stages and agents will now be described. As previously described, the pipeline 200B of FIG. 2B the example of FIG. 2B, in the case of call reception, in one design of the same, the stage 201B may be a call screening stage, the stage 202B may be a pre-routing state, the stage 203B may be a call setup failed stage, the stage 204B may be a rejected stage, the stage 205B may be a connected stage, and the stage 206B may be a call ended stage.

While the types of agents that may be used at each stage are limitless, in one example, the call screen stage has a call screening agent that executes logic to screen out particular calls. There may be several call screening agents that the user might have been able to choose from, each containing different ways of screening calls. For instance, some call screening agents may synchronize with databases of call numbers that are reported as know solicitors. Others may rely on the user to identify what numbers are to be screened. Some may provide particular user interfaces, give notifications of incoming calls, and/or allow different levels of customization.

For the pre-routing stage, there may be a personal operator agent that defines what happens when the user is unavailable or unwilling to take the call. For instance, the call might be routed to an assistant, partner, or other team member.

There may also be a voice mail agent that allows takes care of recording a voice mail. Likewise, there may be many options for personal operator agents and voicemail agents that are available to the user. Each may provide somewhat different functionality, options, user interface, customizations, and so forth.

The rejection stage may also have a similar personal operator agent or voicemail agent. Rejection might occur when the caller is not screened out, and thus the phone is allowed to sound or vibrate, but the user just cannot or chooses not to take the call right then, and thus presses a call reject control. In fact, there may be personal operator agents that are essentially multi-stage agents that the user may select for application to multiple stages. Alternatively or in addition, the personal operator agent may be only drafted towards and usable for a single stage. Alternatively or in addition, the personal operator agent might be physical capable of performing for different stages, but the user might select that the agent be used for only one of the agents. Likewise, the voice mail agent may be a multi-stage agent for both the pre-routing and/or rejection stages.

For the connected stages, the user might be able to select timer agents, recorder agents, billing agents and the like. For instance, the timer agent might time the call, and display and/or log the time of the call. A recorder agent may further give an option to record the call. A billing agent may take care of payment for the call. All or some of these functions may be combined into a single agent. The user may have many options for such agents available to the user.

A call ended stage may, for instance, have a recording saver agent that saves any recording of the call that was initiated by a call recording agent. Such an agent may be an example of a multi-stage agent that initiates recording during or at the commencement of the call, and saves the call when the call is ended. A billing agent may also be used at the call-ended stage to thereby charge payment for the call. The billing agent is another example of a possible multi-stage agent that operates during the call connected stage, and during the call ended stage.

The user interface 423 may be updated whenever the user selects an agent for a stage so as to no longer show agents as available for assignment, when those agents are no longer available for any stages that do not have agents assigned to them.

Accordingly, the principles described herein provide an effective mechanism for augmenting and customizing the performance of a communication pipeline. Assignments of agents are made per stage. This allows the functionality of the agent to be simplified more towards augmenting the functionality of the stage. Accordingly, the logic of the agent is simplified, thereby making it more likely that there will be a healthy quality of agents available to select from for each stage. From the pipeline users' perspective, this allows a greater degree of customization of the communication enabled by the pipeline.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An agent management computing system for assigning agents to a communication pipeline having a plurality of stages;

an agent registry including a plurality or registered pipeline augmentation agents, each pipeline augmentation agent comprising at least (i) an indication of compatibility for at least one of the plurality of stages, and (ii) executable code configured to augment the at least one compatible stage when assigned to the at least one compatible stage;

an enforcement component that enforces that each of at least some of the plurality of stages have only one agent; and based at least upon the indication of compatibility from the agent registry, an agent assignment component that selects an agent from the agent registry to be assigned to a particular stage of the plurality of stages subject to the enforcement of the enforcement agent.

2. The agent management computing system in accordance with claim 1, the communication pipeline comprising a text-based communication pipeline.

3. The agent management computing system in accordance with claim 2, the text-based communication pipeline comprising a text communication pipeline.

4. The agent management computing system in accordance with claim 2, the text-based communication pipeline comprising an instant messaging communication pipeline.

5. The agent management computing system in accordance with claim 1, the communication pipelines comprising an audio communication pipeline.

6. The agent management computing system in accordance with claim 1, the communication pipelines comprising a video communication pipeline.

7. The agent management computing system in accordance with claim 1, the communication pipelines comprising a call initiation pipeline.

8. The agent management computing system in accordance with claim 1, the communication pipelines comprising a call receiving pipeline.

9. The agent management computing system in accordance with claim 8, the particular stage comprising a call screening stage, the selected agent being a call screening agent.

10. The agent management computing system in accordance with claim 8, the particular stage comprising a pre-routing stage, the selected agent being a personal operator agent.

11. The agent management computing system in accordance with claim 8, the particular stage comprising a call setup failed stage, the selected agent being a personal operator agent or a voicemail agent.

12. The agent management computing system in accordance with claim 8, the particular stage comprising a rejection stage, the selected agent being a personal operator agent or a voicemail agent.

13. The agent management computing system in accordance with claim 8, the particular stage comprising a connected stage, the selected agent being at least one of a timer agent, a recorder agent, and a billing agent.

14. The agent management computing system in accordance with claim 8, the particular stage comprising a call ended stage, the selected agent being at least one of a recording saver agent and a billing agent.

15. The agent management computing system in accordance with claim 1, the selected agent being selected for multiple of the plurality of stages.

16. The agent management computing system in accordance with claim 1, the enforcement component enforcing that each of at least all of the stages have only one agent.

17. The agent management computing system in accordance with claim 1, the agent assignment component selecting, for each of at least some of the plurality of stages, an agent to be assigned subject to the enforcement of the enforcement agent.

18. The agent management computing system in accordance with claim 1, the selected agent being the same for at least multiple of the at least some of the plurality of stages.

19. A method for customizing a communication pipeline having a plurality of stages, the method comprising:
   for each of at least some of the plurality of stages, and based at least upon an indication of compatibility obtained from an agent registry, identifying from within the agent registry a set of one or more agents that are available for assigning to the plurality of stages, wherein the agent registry includes a plurality of registered pipeline augmentation agents, each pipeline augmentation agent comprising at least (i) an indication of compatibility for at least one of the plurality of stages, and (ii) executable code configure to augment the at least one compatible stage when assigned to the at least one compatible stage;
   identifying a particular stage that does not already have an agent assigned;
   receiving a user selection of an agent from the set of one or more agents identified from within the agent registry to be assigned to the particular stage;
   in response to receiving the user selection of an agent, assigning the selected agent to the particular stage; and
   enforcing that there be only one agent assigned at most to each stage.

20. The method in accordance with claim 19, at least some of the plurality of stages being performed on a mobile telephone, the user selection occurring also using the mobile telephone.

21. A computer program product comprising one or more computer-readable hardware storage device having thereon computer-executable instructions that are structure such that, when executed by one or more processors of the computing system, configure the computing system to customize a communication pipeline having a plurality of stages so that the computing system performs the following:
   for each of at least some of the plurality of stages, and based at least upon an indication of compatibility obtained from an agent registry, identifying from within the agent registry a set of one or more agents that are available for assigning to the plurality of stages, wherein the agent registry includes a plurality of registered pipeline augmentation agents, each pipeline augmentation agent comprising at least (i) an indication of compatibility for at least one of the plurality of stages, and (ii) executable code configure to augment the at least one compatible stage when assigned to the at least one compatible stage;
   identifying a particular stage that does not already have an agent assigned;
   receiving a user selection of an agent from the set of one or more agents identified from within the agent registry to be assigned to a particular stage;
   in response to receiving the user selection of an agent, assigning the selected agent to the particular stage;
   enforcing that there be only one agent assigned at most to each stage.

* * * * *